US012795475B2

(12) United States Patent
Hwang et al.

(10) Patent No.: US 12,795,475 B2
(45) Date of Patent: Nov. 10, 2026

(54) APPARATUS AND METHOD FOR CONDITIONAL MOBILITY ON SECONDARY NODE INITIATED BY MASTER NODE IN WIRELESS COMMUNICATION SYSTEMS

(71) Applicant: Samsung Electronics Co., Ltd., Suwon-si (KR)

(72) Inventors: June Hwang, Suwon-si (KR); Seungri Jin, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 519 days.

(21) Appl. No.: 18/046,845

(22) Filed: Oct. 14, 2022

(65) Prior Publication Data

US 2023/0124607 A1 Apr. 20, 2023

(30) Foreign Application Priority Data

Oct. 14, 2021 (KR) ........................ 10-2021-0136920

(51) Int. Cl.
*H04W 36/00* (2009.01)

(52) U.S. Cl.
CPC ... *H04W 36/0085* (2018.08); *H04W 36/0069* (2018.08)

(58) Field of Classification Search
CPC ......... H04W 36/0005; H04W 36/0055; H04W 36/0069; H04W 36/0083;
(Continued)

(56) References Cited

U.S. PATENT DOCUMENTS

2018/0227783 A1* 8/2018 Shen ..................... H04W 24/08
2020/0145889 A1* 5/2020 Yamada .......... H04W 36/00838
(Continued)

FOREIGN PATENT DOCUMENTS

CN 113473547 A 10/2021
KR 10-2021-0003646 A 1/2021
(Continued)

OTHER PUBLICATIONS

Ericsson, "Network procedures and signalling for CPAC", 3GPP TSG-RAN WG2 #115e, Aug. 16-27, 2021, R2-2108112, 14 pages.
(Continued)

*Primary Examiner* — Matthew W Genack

(57) ABSTRACT

A method performed by a master node supporting a dual connectivity operation in a wireless communication system is provided. The method includes determining to change a source PScell to target PScell, transmitting, to a terminal, a configuration message for a conditional PScell change, the configuration message including information on a measurement to be performed by the terminal, receiving, from the terminal, a configuration complete message in case that a condition for the conditional PScell change is satisfied, and transmitting, to a target SN of the target PScell, a SN reconfiguration complete message, wherein the information on the measurement includes first information on a measurement object and second information on a report configuration associated with the measurement, and wherein the second information on the report configuration includes information on an event associated with the target PScell.

20 Claims, 11 Drawing Sheets

(58) Field of Classification Search
CPC ..... H04W 36/00833; H04W 36/00835; H04W 36/00837; H04W 36/0085; H04W 36/0088; H04W 36/0094
See application file for complete search history.

(56) References Cited

U.S. PATENT DOCUMENTS

| | | | | |
|---|---|---|---|---|
| 2021/0099926 | A1* | 4/2021 | Chen | H04L 5/0098 |
| 2022/0116840 | A1* | 4/2022 | Purkayastha | H04L 1/1896 |
| 2022/0201563 | A1* | 6/2022 | Li | H04W 36/00695 |
| 2022/0369172 | A1 | 11/2022 | Hwang et al. | |
| 2022/0408325 | A1* | 12/2022 | Da Silva | H04W 76/15 |
| 2023/0199521 | A1* | 6/2023 | Cui | H04W 24/02 370/329 |
| 2024/0098611 | A1* | 3/2024 | Da Silva | H04W 24/08 |

FOREIGN PATENT DOCUMENTS

| | | | | |
|---|---|---|---|---|
| WO | 2021066567 | A1 | 4/2021 | |
| WO | WO-2021075844 | A1 * | 4/2021 | H04W 36/362 |

OTHER PUBLICATIONS

Ericsson, "UE procedures and signalling for CPAC", 3GPP TSG-RAN WG2 #115-e, Aug. 9-27, 2021, R2-2108113, 14 pages.
Apple, "Discussion on CPAC open issues", 3GPP TSG-RAN WG2 Meeting #115-e, Aug. 16-27, 2021, R2-2107594, 3 pages.
Vivo, "Discussion on CPAC procedures from UE perspective", 3GPP TSG-RAN WG2 Meeting #115-e, Aug. 16-27, 2021, R2-2107405, 3 pages.
International Search Report and Written Opinion of the International Searching Authority dated Jan. 16, 2023 in connection with International Patent Application No. PCT/KR2022/015634, 7 pages.
3GPP TS 36.331 V16.6.0 (Sep. 2021), Technical Specification, 3rd Generation Partnership Project; Technical Specification Group Radio Access Network; Evolved Universal Terrestrial Radio Access (E-UTRA); Radio Resource Control (RRC); Protocol specification (Release 16), Sep. 2021, 1091 pages.
Supplementary European Search Report dated Dec. 6, 2024, in connection with European Patent Application No. 22881415.8, 14 pages.
Ericsson, "Conditional PSCell Change / Addition," R2-2101270, 3GPP TSG-RAN WG2 #113e, Electronic meeting, Jan. 25-Feb. 51, 2021, 12 pages.
ZTE, "Discussion on CPA and CPC," R3-210183, 3GPP TSG-RAN WG3 #111-e, Online, Jan. 25-Feb. 4, 2021, 9 pages.

* cited by examiner

APPARATUS AND METHOD FOR CONDITIONAL MOBILITY ON SECONDARY NODE INITIATED BY MASTER NODE IN WIRELESS COMMUNICATION SYSTEMS

CROSS-REFERENCE TO RELATED APPLICATION

This application is based on and claims priority under 35 U.S.C. § 119 to Korean Patent Application No. 10-2021-0136920, filed on Oct. 14, 2021, in the Korean Intellectual Property Office, the disclosure of which is herein incorporated by reference in its entirety.

BACKGROUND

1. Field

The disclosure relates to a method and an apparatus for conditionally changing a primary secondary cell (PScell) of a terminal by a master node in a wireless communication system.

2 Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6th generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra-reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

The present disclosure has been made to address the above-mentioned problems and disadvantages, and to provide at least the advantages described below.

According to an aspect of the disclosure, a method performed by a master node supporting a dual connectivity operation in a wireless communication system includes determining to change a source primary secondary cell (PScell) to target PScell, transmitting, to a terminal, a configuration message for a conditional PScell change, the configuration message including information on a measurement to be performed by the terminal, receiving, from the terminal, a configuration complete message in case that a condition for the conditional PScell change is satisfied, and transmitting, to a target secondary node (SN) of the target PScell, a SN reconfiguration complete message, wherein the information on the measurement includes first information on a measurement object and second information on a report configuration associated with the measurement, and wherein the second information on the report configuration includes information on an event associated with the target PScell.

According to another aspect of the disclosure, a method performed by a terminal supporting a dual connectivity in a wireless communication system includes receiving, from a master node, a configuration message for a conditional PScell change, the configuration message including information on a measurement to be performed by the terminal, performing the measurement for evaluating whether a condition for the conditional PScell change is satisfied, based on the configuration message, and transmitting, to the master node, a configuration complete message in case that the condition for the conditional PScell change is satisfied, wherein the information on the measurement includes first information on a measurement object and second information on a report configuration associated with the measurement, and wherein the second information on the report configuration includes information on an event associated with the target PScell.

According to another aspect of the disclosure, a master node supporting a dual connectivity operation in a wireless communication system includes a transceiver and a processor configured to: determine to change a source PScell to target PScell, control the transceiver to transmit, to a terminal, a configuration message for a conditional PScell change, the configuration message including information on a measurement to be performed by the terminal, control the transceiver to receive, from the terminal, a configuration complete message in case that a condition for the conditional PScell change is satisfied, and control the transceiver to transmit, to a target SN of the target PScell, a SN reconfiguration complete message, wherein the information on the measurement includes first information on a measurement object and second information on a report configuration associated with the measurement, and wherein the second information on the report configuration includes information on an event associated with the target PScell.

According to another aspect of the disclosure, a terminal supporting a dual connectivity in a wireless communication system includes a transceiver, and a processor configured to: control the transceiver to receive, from a master node, a configuration message for a conditional PScell change, the configuration message including information on a measurement to be performed by the terminal, perform the measurement for evaluating whether a condition for the conditional PScell change is satisfied, based on the configuration message, and control the transceiver to transmit, to the master node, a configuration complete message in case that the condition for the conditional PScell change is satisfied, wherein the information on the measurement includes first information on a measurement object and second information on a report configuration associated with the measurement, and wherein the second information on the report configuration includes information on an event associated with the target PScell.

The technical problems to be achieved in the embodiment of the disclosure are not limited to the technical problems mentioned above, and other technical problems not mentioned herein will be clearly understood from the following description by those skilled in the art to which the disclosure belongs.

Before undertaking the DETAILED DESCRIPTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
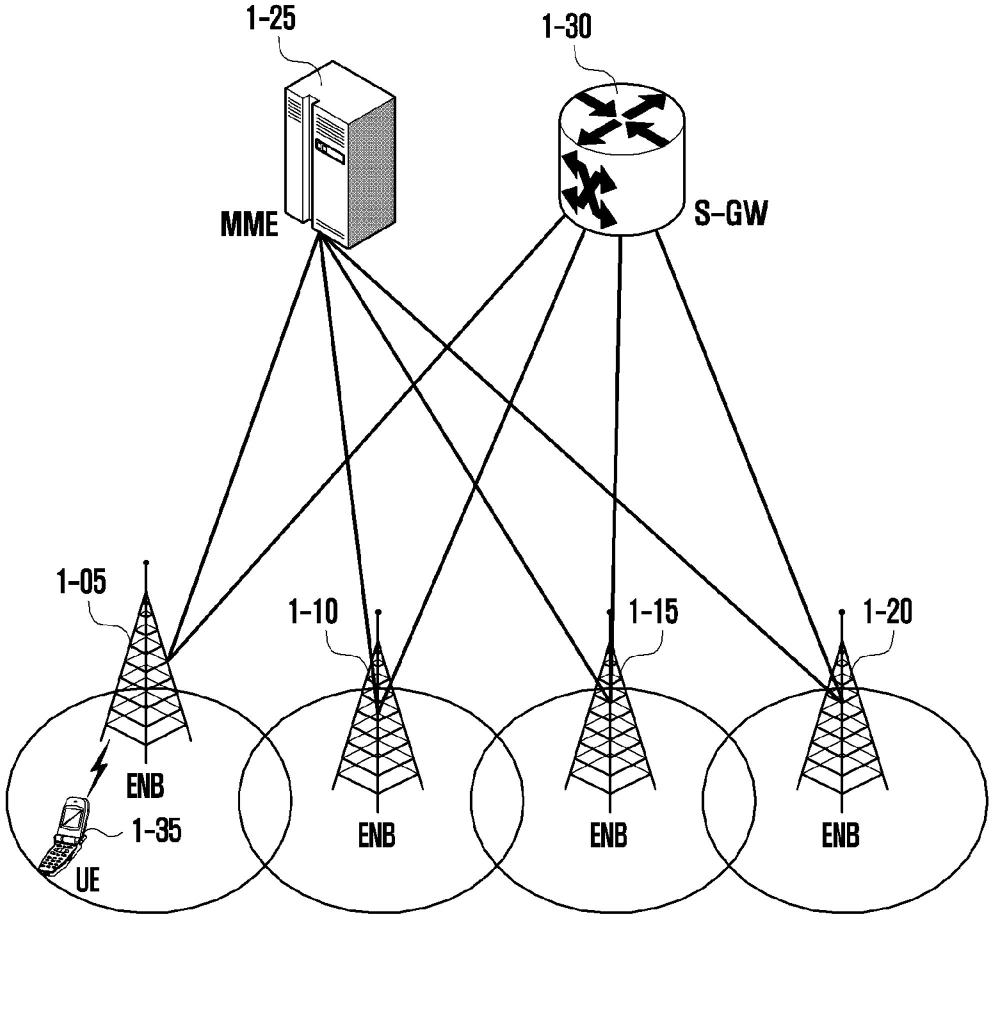
FIG. 1 illustrates a structure in long term evolution (LTE) system according to an embodiment of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

When a master node (MN) is capable of attempting a primary secondary cell (PScell) change to a terminal in which dual connectivity (DC) is established, a method for determining the current signal strength of a PScell, which serves as a condition for the PScell change, does not exist in the prior art.

An embodiment of the disclosure is to provide a method and an apparatus for configuring information on conditional PScell change (CPC) to a terminal so that the terminal can perform a PScell change based on the signal strength of the PScell.

According to an embodiment of the disclosure, the MN may configure a condition for performing a PScell change, and when the corresponding condition is satisfied, the terminal may perform the PScell change.

Further, according to an embodiment of the disclosure, the MN may obtain information on a current PScell from a secondary node for the PScell change.

Effects obtainable in the disclosure are not limited to the effects mentioned above, and other effects not mentioned may be clearly understood by those skilled in the art to which the disclosure belongs from the following description.

The advantages and features of the disclosure and ways to achieve them will be apparent by referring to embodiments as described below in detail in conjunction with the accompanying drawings. However, the disclosure is not limited to the embodiments set forth below, but may be implemented in various different forms. The following embodiments are provided only to completely disclose and inform those skilled in the art of the scope of the disclosure, and the appended claims. The disclosure is only defined by the scope of the claims. In the disclosure, identical or corresponding elements are provided with identical reference numerals Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create a means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more central processing units (CPUs) within a device or a security multimedia card. Further, the "unit" in the embodiments may include one or more processors.

In describing the embodiments, descriptions of technical contents that are well known in the technical field to which the disclosure pertains and are not directly related to the disclosure will be omitted. This is to more clearly convey the subject of the disclosure without obscuring the subject of the disclosure by omitting unnecessary description. Hereinafter, embodiments of the disclosure are described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards.

In the disclosure, eNB may be used interchangeably with gNB for convenience of description. That is, a base station described as an eNB may represent a gNB. Also, the term terminal may refer to mobile phones, NB-IoT devices, sensors, as well as other wireless communication devices.

In the following description, a base station is an entity that allocates resources to terminals, and may be at least one of a next-generation node B (gNode B), an evolved Node B (eNode B), a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Examples of the base station and the terminal are not limited thereto.

More particularly, the disclosure may be applied to 3GPP NR (5th generation mobile communication standards). Further, the disclosure may be applied to intelligent services (e.g., smart homes, smart buildings, smart cities, smart cars or connected cars, healthcare, digital education, retail business, security and safety-related services, or the like) based on 5G communication technologies and IoT-related technologies. In the disclosure, the term "eNB" may be interchangeably used with the term "gNB." For example, a base station described as "eNB" may indicate "gNB." Further, the term "terminal" may indicate cellular phones, NB-IoT devices, sensors, and other wireless communication devices.

Wireless communication systems have expanded beyond the original role of providing a voice-oriented service and have evolved into wideband wireless communication systems that provide a high-speed and high-quality packet data service according to, for example, communication standards, such as high-speed packet access (HSPA), long-term evolution (LTE or evolved universal terrestrial radio access (E-UTRA)), LTE-Advanced (LTE-A), and LTE-Pro of 3GPP, high-rate packet data (HRPD) and a ultra-mobile broadband (UMB) of 3GPP2, and 802.16e of the institute of electrical and electronics engineers (IEEE).

As a representative example of the broadband wireless communication systems, in an LTE system, an orthogonal frequency-division multiplexing (OFDM) scheme has been adopted for a downlink (DL), and a single carrier frequency division multiple access (SC-FDMA) scheme has been adopted for an uplink (UL). The uplink indicates a radio link through which data or a control signal is transmitted from a terminal (a user equipment (UE), a mobile station (MS), or a terminal) to a base station (an eNode B or a base station (BS)), and the downlink indicates a radio link through which data or a control signal is transmitted from a base station to a terminal. In the above-mentioned multiple-access scheme, normally, data or control information is distinguished according to a user by assigning or managing time-frequency resources for carrying data or control information of each user, wherein the time-frequency resources do not overlap, that is, orthogonality is established.

A future communication system subsequent to the LTE, that is, a 5G communication system, has to be able to freely reflect various requirements from a user, a service provider, and the like, and thus service satisfying all of the various requirements needs to be supported. The services considered for the 5G communication system include enhanced mobile broadband (eMBB), massive machine-type communication (mMTC), ultra-reliable low-latency communication (URLLC), or the like.

According to an embodiment of the disclosure, the eMBB aims to provide a data rate superior to the data rate supported by the existing LTE, LTE-A, or LTE-Pro. For example, in the 5G communication system, the eMBB may be able to provide a peak data rate of 20 gigabytes per second (Gbps) in the downlink and a peak data rate of 10 Gbps in the uplink from the viewpoint of one base station. In addition, the 5G communication system may be able to provide not only the peak data rate but also an increased user-perceived terminal data rate. In order to satisfy such requirements, improvement of various transmitting and receiving technologies including a further improved multi-input multi-output (MIMO) transmission technology may be required in the 5G communication system. In addition, a signal is transmitted using a transmission bandwidth of up to 20 megahertz (MHz) in the 2 gigahertz (GHz) band used by the current LTE, but the 5G communication system uses a bandwidth wider than 20 MHz in the frequency band of 3 to 6 GHz or 6 GHz or higher, thereby satisfying the data rate required in the 5G communication system.

In addition, the mMTC is being considered to support application services, such as the Internet of Things (IoT) in the 5G communication system. The mMTC may be required to support access by a large number of terminals in a cell, coverage enhancement of a terminal, improved battery time, and cost reduction of a terminal in order to efficiently provide the IoT. The IoT needs to be able to support a large number of terminals (for example, 1,000,000 terminals/km2) in a cell because the IoT is attached to various sensors and devices to provide communication functions. Further, a terminal supporting mMTC is more likely to be located in a shaded area that is not covered by a cell due to the nature of services, such as a basement of a building, and thus the terminal requires wider coverage than other services provided in the 5G communication system. The terminal supporting mMTC needs to be configured as an inexpensive terminal and may require a very long battery lifetime, such as 10 to 15 years, because it is difficult to frequently replace the battery of the terminal.

Finally, the URLLC is a cellular-based wireless communication service used for mission-critical purposes, and may be applied to services used for remote control for a robot or machinery, industrial automation, an unmanned aerial vehicle, remote health care, an emergency alert, or the like. Therefore, the communication provided by the URLLC may provide very low latency (ultra-low latency) and very high reliability (ultra-high reliability). For example, a service that supports the URLLC needs to satisfy air interface latency of less than 0.5 milliseconds, and may also have requirements of a packet error rate of 5-10% or lower. Therefore, for the service that supports the URLLC, the 5G system needs to provide a transmission time interval (TTI) smaller than those of other services, and design matters for allocating wide resources in the frequency band in order to secure reliability of the communication link may also arise.

The above-described three services considered in the 5G communication system, that is, the eMBB, the URLLC, and the mMTC, may be multiplexed and transmitted in a single system. Here, in order to satisfy the different requirements of each of the services, different transmission or reception schemes and different transmission and reception variables may be used for the services. However, the above-described mMTC, URLLC, and eMBB are merely examples of different types of services, and the types of services which are to be applied according to the disclosure are not limited to the above-described examples.

In addition, hereinafter, embodiments of the disclosure will be described by taking an LTE, LTE-A, LTE-Pro, or 5G (or NR, that is, new-generation mobile communication) system as an example, but embodiments of the disclosure may be applied to other communication systems having a similar technical background or channel form. In addition, embodiments of the disclosure may be applied to other communication systems upon determination by those skilled in the art through some modifications without greatly departing from the scope of the disclosure.

Hereinafter, embodiments of the disclosure are described with reference to the accompanying drawings.

In describing the embodiments, descriptions of technical contents that are well known in the technical field to which the disclosure pertains and are not directly related to the disclosure will be omitted. This is to more clearly convey the subject of the disclosure without obscuring the subject of the disclosure by omitting unnecessary description. The terms which will be described below are terms defined in consideration of the functions in the disclosure, and may be different according to users, intentions of the users, or customs. Therefore, the definitions of the terms should be made based on the contents throughout the specification.

FIG. 1 illustrates a structure in an LTE system according to an embodiment of the present disclosure.

Referring to FIG. 1, a wireless access network of the LTE system may include next-generation base stations (evolved Node Bs, hereinafter, referred to as "ENBs," "Node Bs," or "base stations") 1-05, 1-10, 1-15, and 1-20, a mobility management entity (MME) 1-25, and a serving-gateway (S-GW) 1-30. A user equipment (hereinafter, referred to as a "UE" or a "terminal") 1-35 may access an external network through the ENBs 1-05 to 1-20 and the S-GW 1-30.

In FIG. 1, the ENBs 1-05 to 1-20 may correspond to the existing Node Bs of a universal mobile telecommunication system (UMTS). The ENB may be connected to the UE 1-35 via a radio channel, and may perform more complex functions than the existing Node B. In the LTE system, all user traffics including real-time services, such as voice over Internet protocol (VoIP) may be serviced through a shared channel. Accordingly, a device for collecting state information, such as buffer state information of UEs, available transmission power state information of UEs, and channel state information of UEs, and performing scheduling may be required, and each of the ENBs 1-05 to 1-20 may serve as such a device. A single ENB may generally control multiple cells. For example, the LTE system uses a radio-access technology, such as orthogonal frequency-division multiplexing (OFDM) in a bandwidth of 20 MHz to achieve a data rate of 100 Mbps.

In addition, the ENB may also apply an adaptive modulation & coding (AMC) scheme for determining a modulation scheme and a channel-coding rate in accordance with the channel state of a terminal. The S-GW 130 is a device for providing a data bearer, and may generate or release the data bearer under the control of the MME 1-25. The MME is a device for performing a mobility management function and various control functions for a terminal, and may be connected to multiple base stations.

Figure 2:
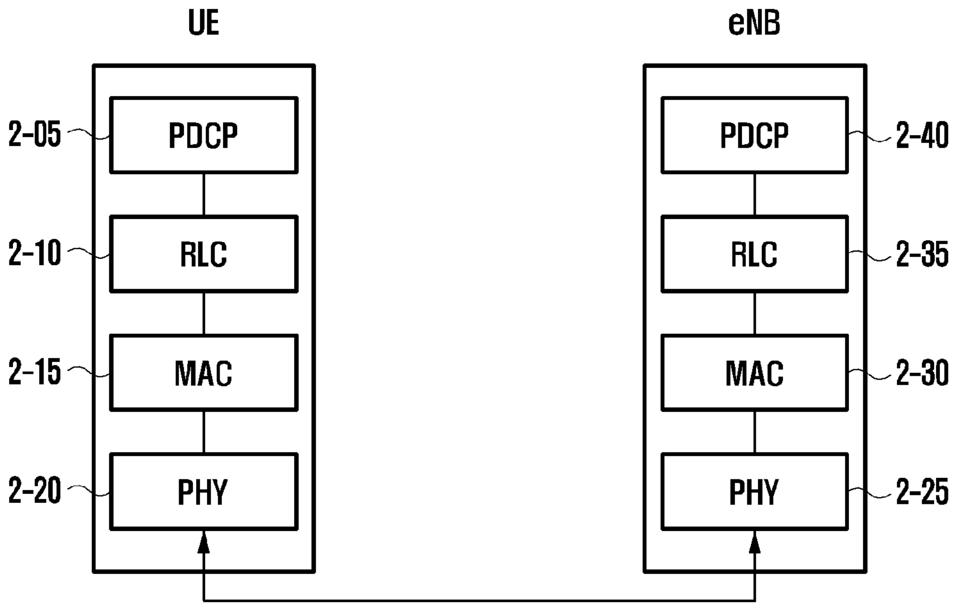
FIG. 2 illustrates a radio protocol structure in an LTE system according to an embodiment of the disclosure.

FIG. 2 illustrates a radio protocol structure in an LTE system according to an embodiment of the present disclosure Referring to FIG. 2, the radio protocol in the LTE system includes packet data convergence protocols (PDCPs) 2-05 and 2-40, radio link controls (RLCs) 2-10 and 2-35, medium access controls (MACs) 2-15 and 2-30, and physical (PHY) devices in a terminal and an ENB, respectively. The PDCPs may perform operations of IP header compression/recovery and the like. The main function of the PDCP is summarized below but are not limited thereto:

- Header compression and decompression: robust header compression (ROHC) only;
- Transfer of user data;
- In-sequence delivery of upper layer protocol data units (PDUs) at PDCP re-establishment procedure for RLC acknowledged mode (AM);
- For split bearers in DC (only support for RLC AM): PDCP PDU routing for transmission and PDCP PDU reordering for reception;
- Duplicate detection of lower layer SDUs at PDCP re-establishment procedure for RLC AM;
- Retransmission of PDCP SDUs at handover and, for split bearers in DC, of PDCP PDUs at PDCP data-recovery procedure, for RLC AM;
- Ciphering and deciphering; and/or
- Timer-based service data unit (SDU) discard in uplink.

The radio link controls (RLCs) 2-10 and 2-35 may reconfigure the PDCP protocol data unit (PDU) at an appropriate size to perform an automatic repeat request (ARQ) operation or the like. The main functions of the RLC are summarized below but are not limited thereto:

- Transfer of upper layer PDUs;
- Error Correction through ARQ (only for AM data transfer);
- Concatenation, segmentation, and reassembly of RLC SDUs (only for unacknowledged mode (UM) and AM data transfer);
- Re-segmentation of RLC data PDUs (only for AM data transfer);
- Reordering of RLC data PDUs (only for UM and AM data transfer;
- Duplicate detection (only for UM and AM data transfer);
- Protocol error detection (only for AM data transfer);
- RLC SDU discard (only for UM and AM data transfer); and/or
- RLC re-establishment.

The MACs 2-15 and 2-30 are connected to several RLC layer devices configured in one terminal, and may perform an operation of multiplexing RLC PDUs into a MAC PDU and demultiplexing the RLC PDUs from the MAC PDU. The main functions of the MAC are summarized below but are not limited thereto:

- Mapping between logical channels and transport channels;
- Multiplexing/demultiplexing of MAC SDUs belonging to one or different logical channels into/from transport blocks (TB) delivered to/from the physical layer on transport channels;
- Scheduling information reporting;
- Error correction through hybrid ARQ (HARD);
- Priority handling between logical channels of one UE;

Priority handling between UEs by means of dynamic scheduling;

Multimedia broadcast multicast service (MBMS) service identification;

Transport format selection; and/or

Padding.

Physical layers (PHYs) 2-20 and 2-25 may generate an OFDM symbol by performing channel-coding and modulating upper-layer data and transmit the same through a radio channel, or may perform demodulating and channel-decoding the OFDM symbol received through the radio channel and transmit the same to an upper layer.

Figure 3:
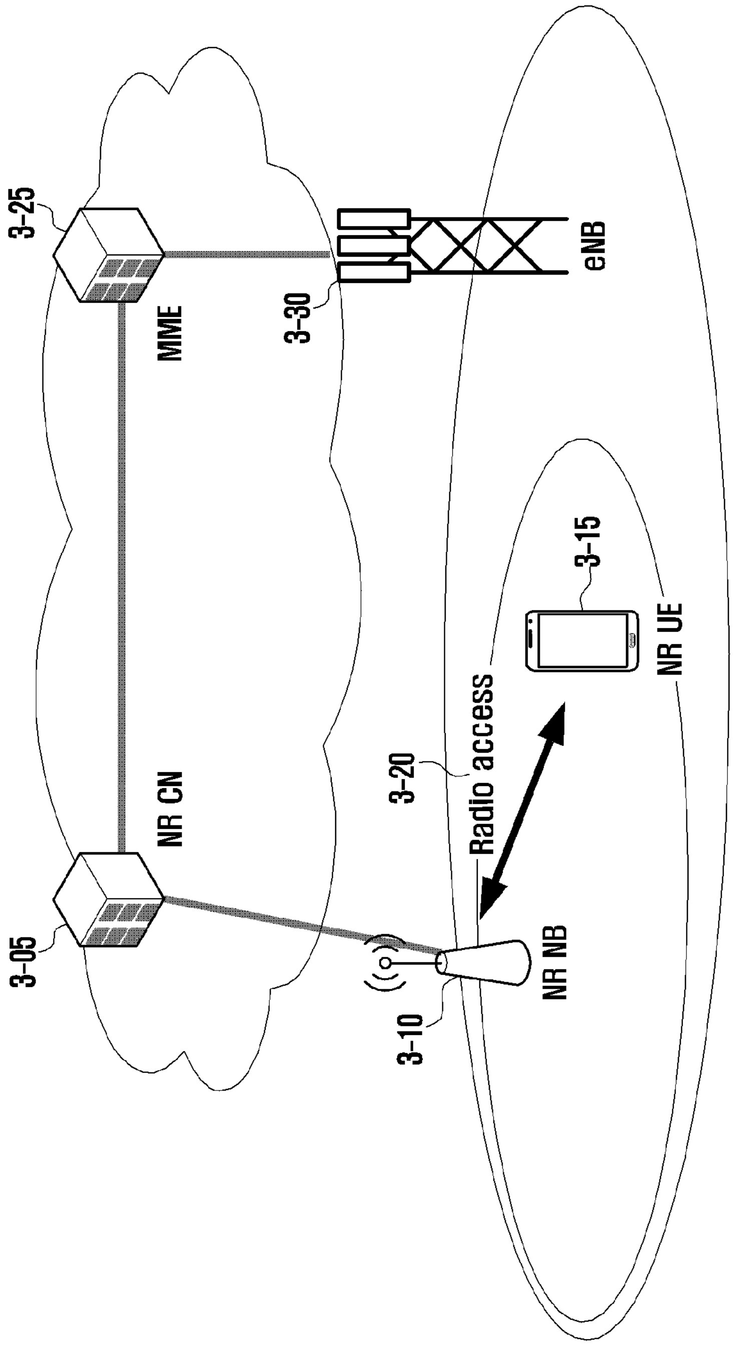
FIG. 3 illustrates a structure in a next-generation mobile communication system according to an embodiment of the present disclosure.

FIG. 3 illustrates a structure in a next-generation mobile communication system according to an embodiment of the present disclosure.

Referring to FIG. 3, a radio access network in the next-generation mobile communication system (hereinafter referred to as "new radio (NR)" or 5G) may include a new-radio base station (a new-radio node B, hereinafter, referred to as an "NR gNB" or an "NR base station") 3-10 and a new-radio core network (NR CN) 3-05. A new-radio user equipment (hereinafter, referred to as an "NR UE" or an "NR terminal") 3-15 may access an external network through the NR gNB 3-10 and the NR CN 3-05.

In FIG. 3, the NR gNB 3-10 may correspond to an evolved node B (eNB) in the existing LTE system. The NR gNB 3-10 may be connected to the NR UE 3-15 through a radio channel, and thus may provide service superior to that of the existing node B. In the next-generation mobile communication system, all user traffic is serviced through shared channels in the next-generation mobile communication system. Accordingly, a device for collecting state information, such as buffer state information of UEs, available transmission power state information of UEs, and channel state information of UEs, and performing scheduling is required, and the NR gNB 3-10 may serve as such a device. A single NR gNB 3-10 may generally control multiple cells. In order to implement ultra-high-speed data transmission in the next-generation mobile communication system as compared with the existing LTE, a bandwidth that is equal to or higher than the existing maximum bandwidth may be applied.

In addition, a beamforming technology may be additionally combined using orthogonal frequency-division multiplexing (OFDM) as radio connection technology. In addition, an adaptive modulation and coding (AMC) scheme that determines a modulation scheme and a channel-coding rate in accordance with the channel state of the terminal may be applied. The NR CN 3-05 may perform a function, such as mobility support, bearer configuration, and quality of service (QoS) configuration. The NR CN 3-05 is a device that performs not only terminal mobility management functions but also various types of control functions, and may be connected to multiple base stations. Further, the next-generation mobile communication system may be linked with the existing LTE system, and the NR CN 3-05 may be connected to the MME 3-25 through a network interface. The MME 3-25 is connected to an eNB 3-30, that is, the existing base station.

Figure 4:
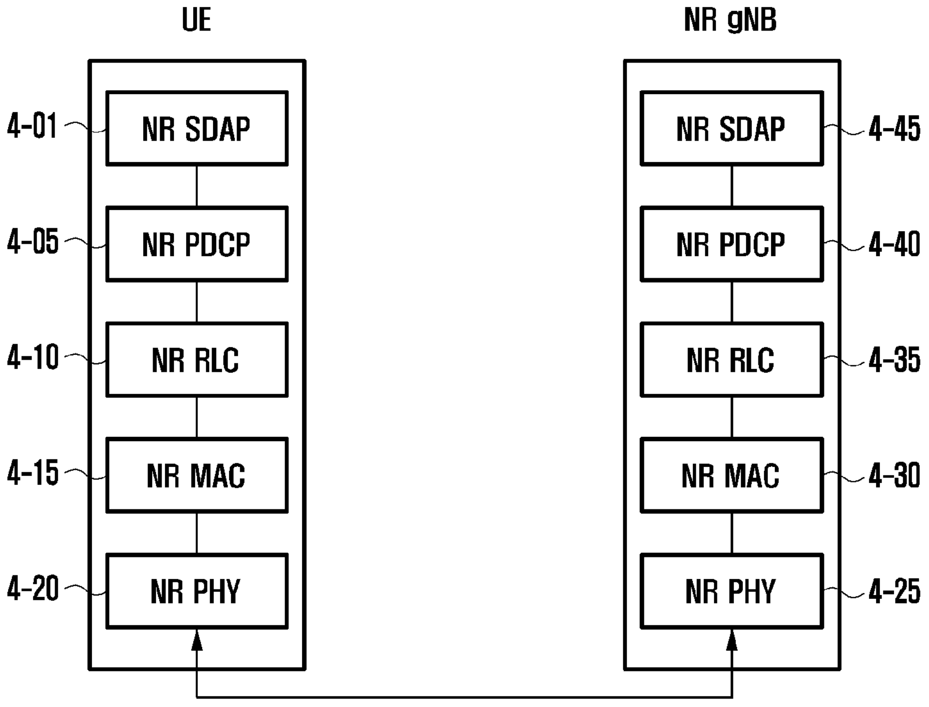
FIG. 4 illustrates a radio protocol structure in a next-generation mobile communication system according to an embodiment of the present disclosure.

FIG. 4 illustrates a radio protocol structure in a next-generation mobile communication system according to an embodiment of the present disclosure.

Referring to FIG. 4, in the radio protocol in the next-generation mobile communication system, a terminal and an NR base station may include NR service data adaptation protocols (SDAPs) 4-01 and 4-45, NR PDCPs 4-05 and 4-40, NR RLCs 4-10 and 4-35, NR MACs 4-15 and 4-30, and NR PHYs devices (or layers) 4-20 and 4-25, respectively.

The main function of the NR SDAPs 4-01 and 4-45 may include some of the following functions but are not limited thereto:

Transfer of user plane data;

Mapping between a QoS flow and a data radio bearer (DRB) for both DL and UL;

Marking QoS flow identity (ID) in both DL and UL packets; and/or

Reflective QoS flow to DRB mapping for the UL SDAP PDUs.

For an SDAP-layer device, the terminal may receive, through a radio resource control (RRC) message, a configuration as to whether to use a header of the SDAP-layer device or to use a function of the SDAP-layer device function for each PDCP layer device, each bearer, or each logical channel. When an SDAP header is configured, the terminal may be indicated to update or reconfigure, with a non-access stratum (NAS) reflective QoS 1-bit indicator and an access stratum (AS) reflective QoS 1-bit indicator of the SDAP header, mapping information for uplink and downlink QoS flows and a data bearer. According to an embodiment of the disclosure, the SDAP header may include QoS flow ID information indicating the QoS. According to an embodiment of the disclosure, the QoS information may be used as data-processing priority, scheduling information, or like in order to support a smooth service.

The main functions of the NR PDCPs 4-05 and 4-40 may include some of the following functions but are not limited thereto:

Header compression and decompression: ROHC only;

Transfer of user data;

In-sequence delivery of upper layer PDUs;

Out-of-sequence delivery of upper layer PDUs;

PDCP PDU reordering for reception;

Duplicate detection of lower layer SDUs;

Retransmission of PDCP SDUs;

Ciphering and deciphering; and/or

Timer-based SDU discard in uplink.

In the above description, the reordering function of the NR PDCP device may refer to a function of sequentially rearranging PDCP PDUs received in a lower layer, based on a PDCP sequence number (SN). The reordering function of the NR PDCP device may include a function of transferring data to an upper layer in the rearranged order, a function of directly transferring data without considering an order, a function of recording lost PDCP PDUs by rearranging an order, a function of reporting a state of the lost PDCP PDUs to a transmission end, and a function of requesting retransmission of the lost PDCP PDUs.

The main function of the NR RLCs 4-10 and 4-35 may include some of the following functions but are not limited thereto:

Transfer of upper layer PDUs;

In-sequence delivery of upper layer PDUs;

Out-of-sequence delivery of upper layer PDUs;

Error Correction through ARQ;

Concatenation, segmentation and reassembly of RLC SDUs;

Re-segmentation of RLC data PDUs;

Reordering of RLC data PDUs;

Duplicate detection;

Protocol error detection;

RLC SDU discard; and/or

RLC re-establishment.

In the above description, the in-sequence delivery function of the NR RLC device may refer to a function of sequentially transferring RLC SDUs received from a lower layer, to an upper layer. When a single RLC SDU is divided into multiple RLC SDUs and the divided multiple RLC SDUs are received, the in-sequence delivery function of the NR RLC device may include a function of rearranging and transferring the same.

The in-sequence delivery function of the NR RLC device may include a function of rearranging the received RLC PDUs, based on an RLC sequence number (SN) or a PDCP sequence number (SN), a function of recording lost RLC PDUs by rearranging an order, a function of reporting the state of the lost RLC PDUs to a transmission end, and a function of requesting retransmission of the lost RLC PDUs.

When there is a lost RLC SDU, the in-sequence delivery function of the NR RLC device may include a function of sequentially transferring only RLC SDUs preceding the lost RLC SDU to the upper layer.

When there is a lost RLC SDU but the timer expires, the in-sequence delivery function of the NR RLC device may include a function of sequentially transferring all RLC SDUs received before a predetermined timer starts to the upper layer.

When there is a lost RLC SDU but the predetermined timer expires, the in-sequence delivery function of the NR RLC device may include a function of transferring all RLC SDUs received up to that point in time to the upper layer.

The NR RLC device may process the RLC PDUs in the received order regardless of the order of serial numbers or sequence numbers, and may deliver the processed RLC PDUs to the NR PDCP device.

When the NR RLC device receives a segment, the NR RLC may receive segments which are stored in a buffer or are to be received later, reconfigure the segments into one complete RLC PDU, and then deliver the same to the NR PDCP device.

The NR RLC layer may not include a concatenation function and may perform the function in the NR MAC layer or may replace the function with a multiplexing function of the NR MAC layer.

In the above description, the out-of-sequence delivery function of the NR RLC device may refer to a function of directly delivering, to the upper layer regardless of order, the RLC SDUs received from the lower layer. When a single RLC SDU is divided into multiple RLC SDUs and the divided multiple RLC SDUs are received, the out-of-sequence delivery function of the NR RLC device may include a function of rearranging and transferring the divided multiple RLC SDUs. The out-of-sequence delivery function of the NR RLC device may include a function of storing the PDCP SN or the RLC SN of each of the received RLC PDUs, arranging the RLC PDUs, and recording the lost RLC PDUs.

The NR MAC 4-15 and 4-30 may be connected to several NR RLC layer devices configured in one terminal, and the main functions of the NR MAC may include some of the following functions but are not limited thereto:

Mapping between logical channels and transport channels;

Multiplexing/demultiplexing of MAC SDUs;

Scheduling information reporting;

Error correction through HARQ;

Priority handling between logical channels of one UE;

Priority handling between UEs by means of dynamic scheduling;

MBMS service identification;

Transport format selection; and/or

Padding.

NR Physical layers (NR PHYs) 4-20 and 4-25 may generate an OFDM symbol by performing channel-coding and modulating upper-layer data and transmit the same through a radio channel, or may perform demodulating and channel-decoding the OFDM symbol received through the radio channel and transmit the same to the upper layer.

Figure 5:
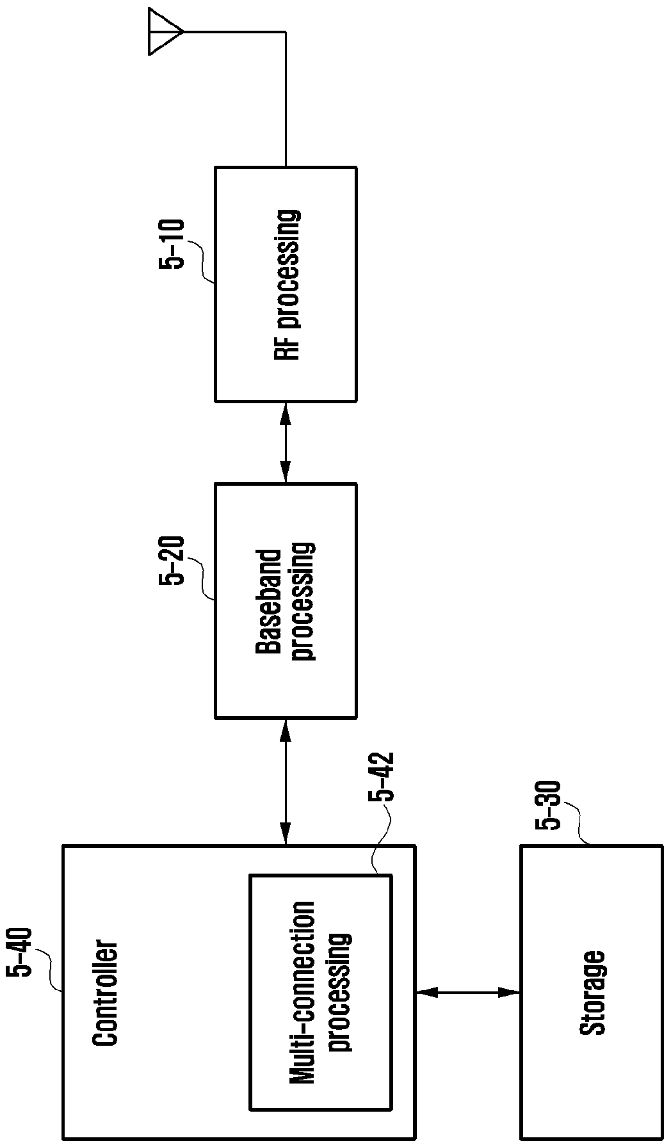
FIG. 5 illustrates an internal structure of a terminal in a wireless communication system according to an embodiment of the present disclosure.

FIG. 5 illustrates an internal structure of a terminal in a wireless communication system according to an embodiment of the present disclosure.

Referring to FIG. 5, the terminal may include a radio frequency (RF) processor 5-10, a baseband processor 5-20, a storage 5-30, and a controller 5-40.

The RF processor 5-10 may perform a function for transmitting or receiving a signal through a radio channel, such as signal band conversion, amplification, and the like. For example, the RF processor 5-10 may up-convert a baseband signal, provided from the baseband processor 5-20, to an RF-band signal and then transmit the RF-band signal through an antenna, and down-convert an RF-band signal received through an antenna into a baseband signal. For example, the RF processor 5-10 may include a transmission filter, a reception filter, an amplifier, a mixer, an oscillator, a digital-to-analog converter (DAC), an analog-to-digital converter (ADC), and the like, but are not limited thereto. Although only a single antenna is illustrated in FIG. 5, the terminal may include multiple antennas. In addition, the RF processor 5-10 may include multiple RF chains. Furthermore, the RF processor 5-10 may perform beamforming. For beamforming, the RF processor 5-10 may adjust the phases and amplitudes of signals transmitted or received through multiple antennas or antenna elements. The RF processor 5-10 may also perform MIMO and may receive data of multiple layers of data during the MIMO operation.

The baseband processor 5-20 performs a function of conversion between a baseband signal and a bitstream according to the physical layer specifications of a system. For example, during data transmission, the baseband processor 5-20 generates complex symbols by encoding and modulating a transmission bitstream. In addition, during data reception, the baseband processor 5-20 may reconstruct a received bitstream by demodulating and decoding a baseband signal provided from the RF processor 5-10. For example, according to an orthogonal frequency-division multiplexing (OFDM) scheme, during data transmission, the baseband processor 5-20 generates complex symbols by encoding and modulating a transmission bitstream, maps the complex symbols to subcarriers, and then configures OFDM symbols by performing inverse fast Fourier transformation (IFFT) operation and cyclic prefix (CP) insertion. Further, during data reception, the baseband processor 5-20 may segment a baseband signal, provided from the RF processor 5-10, into units of OFDM symbols, reconstruct signals mapped to subcarriers by performing a fast Fourier transformation (FFT) operation, and then reconstruct a received bitstream by demodulating and decoding the signals.

The baseband processor 5-20 and the RF processor 5-10 transmit and receive signals as described above. Accordingly, each of the baseband processor 5-20 and the RF processor 5-10 may also be referred to as a transmitter, a receiver, a transceiver, or a communication circuit. Furthermore, at least one of the baseband processor 5-20 and the RF processor 5-10 may include multiple communication modules to support multiple different radio-access technologies. In addition, at least one of the baseband processor 5-20 and the RF processor 5-10 may include multiple communication modules to process signals of different frequency bands. For example, the different radio-access technologies may include a wireless local area network (LAN) (e.g., IEEE 802.11), a cellular network (e.g., LTE), and the like. In addition, the different frequency bands may include a super-high frequency (SHF) (e.g., 2·NRHz, NRhz) band and a millimeter-wave (mmWave) (e.g., 60 GHz) band.

The storage 5-30 stores data, such as basic programs, applications, configuration information, or the like for the operation of the terminal. Specifically, the storage 5-30 may store information related to a second connection node for performing wireless communication by using a second wireless connection technology. In addition, the storage 5-30 provides the stored data in response to a request from the controller 5-40.

The controller 5-40 controls the overall operation of the terminal. For example, the controller 5-40 transmits or receives signals through the baseband processor 5-20 and the RF processor 5-10. Further, the controller 5-40 records and reads data on or from the storage 5-30. To this end, the controller 5-40 may include at least one processor. For example, the controller 5-40 may include a communication processor (CP) for controlling communication and an application processor (AP) for controlling an upper layer, such as an application.

Figure 6:
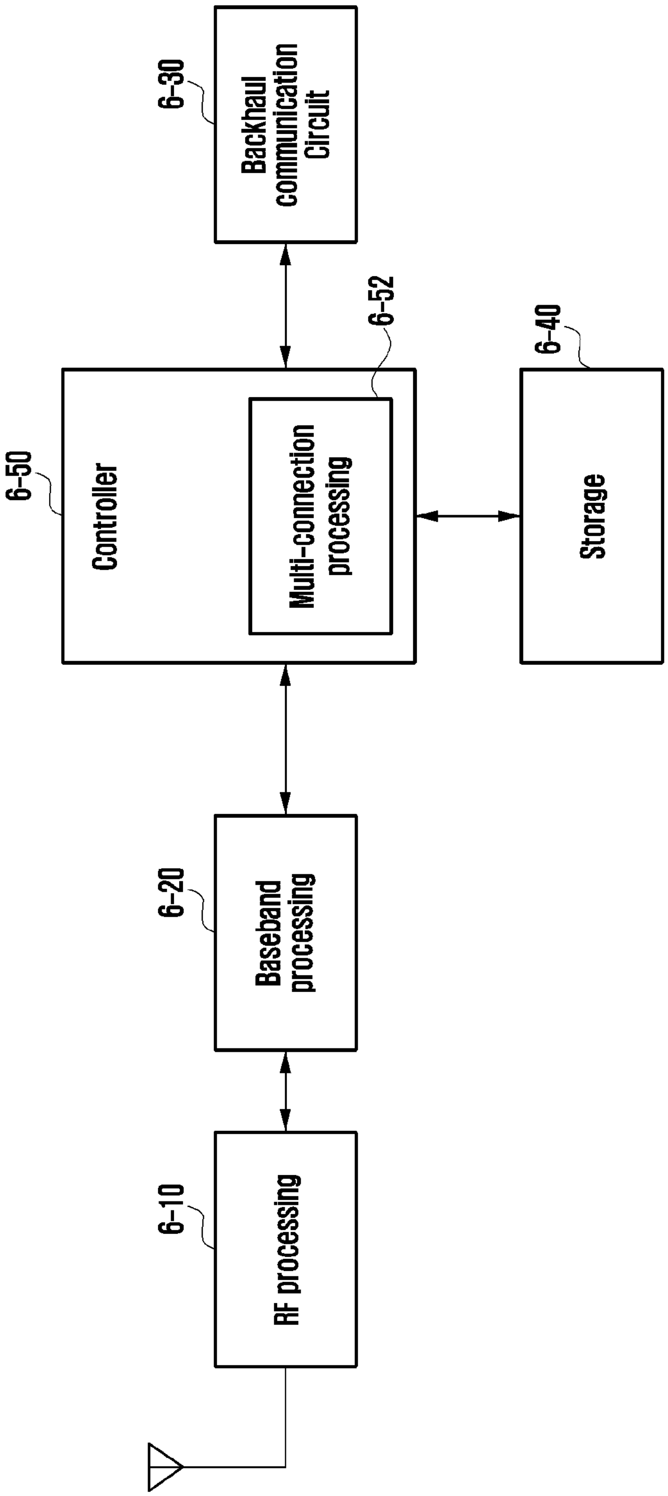
FIG. 6 illustrates a configuration of a base station in a wireless communication system according to an embodiment of the present disclosure.

FIG. 6 illustrates a configuration of a base station in a wireless communication system according to an embodiment of the present disclosure.

Referring to FIG. 6, the base station may include an RF processor 6-10, a baseband processor 6-20, a backhaul communication circuit 6-30, a storage 6-40, and a controller 6-50.

The RF processor 6-10 may perform a function of transmitting or receiving a signal through a radio channel, such as signal band conversion and amplification. For example, the RF processor 6-10 up-converts a baseband signal, provided from the baseband processor 6-20, to an RF-band signal and transmits the converted RF-band signal through an antenna, and down-converts an RF-band signal received through an antenna to a baseband signal. For example, the RF processor 6-10 may include a transmission filter, a reception filter, an amplifier, a mixer, an oscillator, a DAC, an ADC, and the like. Although only a single antenna is illustrated in FIG. 6, the RF processor 6-10 may include multiple antennas. In addition, the RF processor 6-10 may include multiple RF chains. Furthermore, the RF processor 6-10 may perform beamforming. For beamforming, the RF processor 6-10 may adjust phases and amplitudes of signals transmitted or received through multiple antennas or antenna elements. The RF processor 6-10 may perform downlink MIMO operation by transmitting data of one or more layers.

The baseband processor 6-20 may perform conversion between a baseband signal and a bitstream based on the physical layer specifications of a first radio-access technology. For example, during data transmission, the baseband processor 6-20 may generate complex symbols by encoding and modulating a transmission bitstream. In addition, during data reception, the baseband processor 6-20 may reconstruct a received bitstream by demodulating and decoding a baseband signal provided from the RF processor 6-10. For example, according to an OFDM scheme, during data transmission, the baseband processor 6-20 generates complex symbols by encoding and modulating a transmission bitstream, maps the complex symbols to subcarriers, and then configures OFDM symbols by performing IFFT operation and CP insertion.

Further, during data reception, the baseband processor 6-20 may segment a baseband signal, provided from the RF processor 6-10, into units of OFDM symbols, reconstructs signals mapped to subcarriers by performing FFT operation, and then reconstruct a received bitstream by demodulating and decoding the signals. The baseband processor 6-20 and the RF processor 610 may transmit and receive signals as described above. Accordingly, each of the baseband processor 6-20 and the RF processor 6-10 may also be referred to as a transmitter, a receiver, a transceiver, a communication circuit, or a wireless communication circuit.

The backhaul communication circuit 6-30 provides an interface for communicating with other nodes in a network. For example, the backhaul communication circuit 6-30 may convert a bitstream transmitted from a primary base station to another node, for example, the secondary base station, the core network, and the like, into a physical signal, and may convert a physical signal received from another node into a bitstream.

The storage 6-40 stores data, such as basic programs, applications, configuration information, or the like for the operation of the primary base station. The storage 6-40 may store information related to a bearer allocated to a connected terminal, the result of measurement reported from the connected terminal, and the like. In addition, the storage 6-40 may store information which serves as criteria for determining whether or not to provide multi-connectivity to the terminal. Further, the storage 6-40 provides the stored data in response to a request from the controller 6-50.

The controller 6-50 controls the overall operation of the base station. For example, the controller 6-50 transmits or receives a signal through the baseband processor 6-20 and the RF processor 6-10 or through the backhaul communication circuit 6-30. In addition, the controller 6-50 records and reads data on or from the storage 6-40. To this end, the controller 6-50 may include at least one processor.

The terminal of FIG. 5 and/or the base station of FIG. 6 may perform or control embodiments and/or methods of the disclosure to be described below. In addition, the base station of FIG. 6 may mean a master node (MN) or a secondary node (SN).

Figure 7:
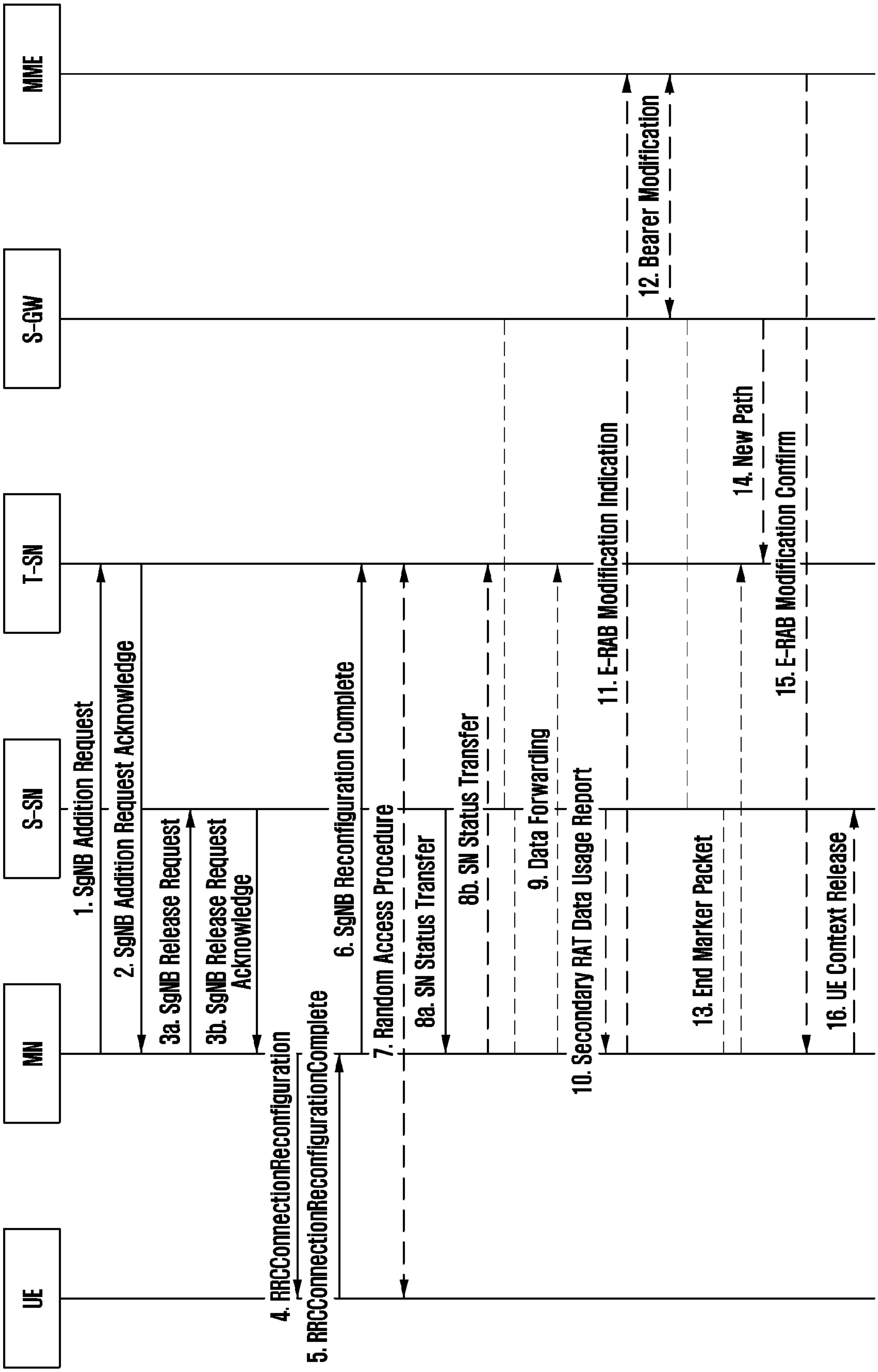
FIG. 7 illustrates existing procedure of a master node initiated SN change according to an embodiment of the present disclosure.

FIG. 7 illustrates an example of a secondary node (SN) modification procedure initiated by a master node (MN) according to an embodiment of the present disclosure.

Each operation of FIG. 7 may be described as shown in Table 1.

TABLE 1

| |
|---|
| 1/2. The MN initiates the SN change by requesting the target SN to allocate resources for the UE by means of the SgNB Addition procedure. The MN may include measurement results related to the target SN. If forwarding is needed, the target SN provides forwarding addresses to the MN. The target SN includes the indication of the full or delta RRC configuration. |
| NOTE 2: The MN may trigger the MN-initiated SN Modification procedure (to the source SN) to retrieve the current SCG configuration before step 1. |
| 3. If the allocation of target SN resources was successful, the MN initiates the release of |

TABLE 1-continued

| |
|---|
| the source SN resources including a Cause indicating SCG mobility. The Source SN may reject the release. If data forwarding is needed the MN provides data forwarding addresses to the source SN. If direct data forwarding is used for SN terminated bearers, the MN provides data forwarding addresses as received from the target SN to source SN. Reception of the SgNB Release Request message triggers the source SN to stop providing user data to the UE and, if applicable, to start data forwarding. |
| 4/5. The MN triggers the UE to apply the new configuration. The MN indicates to the UE the new configuration in the RRCConnectionReconfiguration message including the NR RRC configuration message generated by the target SN. The UE applies the new configuration and sends the RRCConnectionReconfigurationComplete message, including the encoded NR RRC response message for the target SN, if needed. In case the UE is unable to comply with (part of) the configuration included in the RRCConnectionReconfiguration message, it performs the reconfiguration failure procedure. |
| 6. If the RRC connection reconfiguration procedure was successful, the MN informs the target SN via SgNBReconfigurationComplete message with the encoded NR RRC response message for the target SN, if received from the UE. |
| 7. If configured with bearers requiring SCG radio resources, the UE synchronizes to the target SN. |
| 8. For SN terminated bearers using RLC AM, the source SN sends the SN Status Transfer, which the MN sends then to the target SN, if needed. |
| 9. If applicable, data forwarding from the source SN takes place. It may be initiated as early as the source SN receives the SgNB Release Request message from the MN. |
| 10. The source SN sends the Secondary RAT Data Usage Report message to the MN and includes the data volumes delivered to and received from the UE over the NR radio for the related E-RABs. |
| NOTE 3: The order the SN sends the Secondary RAT Data Usage Report message and performs data forwarding with MN is not defined. The SN may send the report when the transmission of the related bearer is stopped. |
| 11-15. If applicable, a path update is triggered by the MN. |
| 16. Upon reception of the UE Context Release message, the source SN releases radio and C-plane related resources associated to the UE context. Any ongoing data forwarding may continue. |

Figure 8:
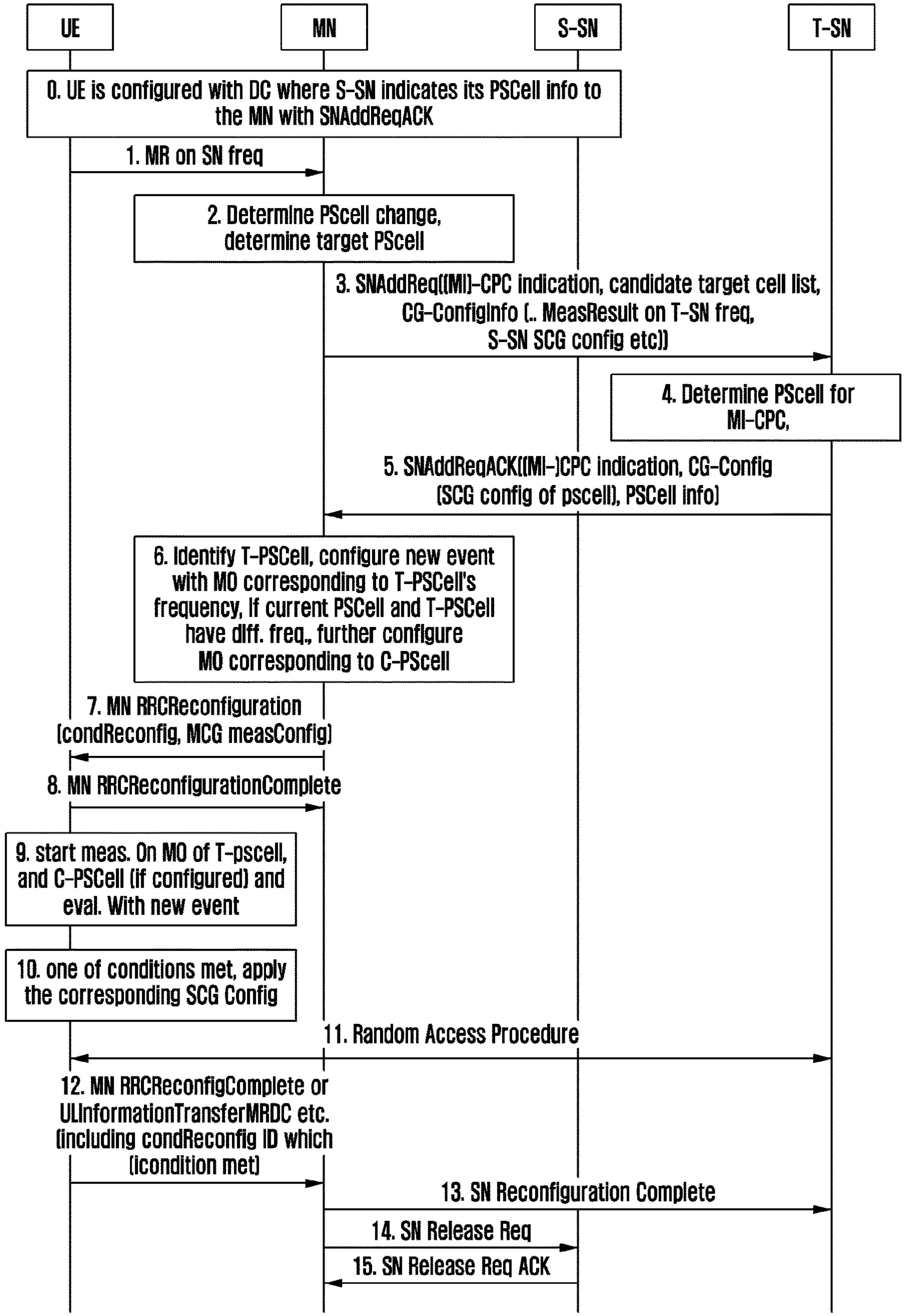
FIG. 8 illustrates a procedure of a master node initiated conditional PScell change (MI-CPC) according to an embodiment of the present disclosure.

FIG. 8 is a flowchart illustrating a MN initiated conditional PScell change (CPC) (hereinafter, “MI-CPC”) according to an embodiment of the present disclosure.

The order of the operation steps shown in FIG. 8 may be changed from each other. In addition, in some cases, some operation steps of FIG. 8 may be omitted or two or more steps may be combined to be performed as one step.

With reference to FIG. 8, each step will be described in detail.

In step 0, it is assumed that a UE is in a dual connectivity (DC) state in which the UE is connected to an MN and a source SN (S-SN). The MN may obtain PScell information from the S-SN through one of the following two methods.

In one embodiment (Unconditional), in order to obtain current PScell information: S-SN may receive an SNAddReq message of the MN to perform PScell addition or PScell change. In this case, the S-SN may transfer an SNAddReqACK message to the MN. Alternatively, when a secondary cell group (SCG) modification or PScell change occurs due to an internal operation of the SN, the S-SN may transfer an SNModificationRequired message to the MN. The S-SN may add the followings to the above cases to transmit the same to the MN.

For example, the S-SN may add at least one piece of information among a physical cell identity (PCI), a cell global identifier (CGI), or an absolute radio-frequency channel number (ARFCN) of a current (determined) PScell to an inter node message (INM) of an RRC container or X2/Xn field, and transfer the message to the MN.

In one embodiment, after the MN determines to perform a CPC after establishing a DC, the MN may request information for recognition of the current PScell to the SN through an Xn/X2 message as a separate message. The current SN having received this message may include the information of the current PScell in the Xn/X2 field of the Xn/X2 message and transfer the same to the MN.

For example, the current SN may add at least one piece of information among PCI, CGI, and ARFCN of the current (determined) PScell to the INM of the RRC container or X2/Xn field and transfer the message to the MN.

Through this method, the MN may be in a situation of knowing the current PScell.

In step 1, a UE may report measurement information on the frequency related to the S-SN to the MN.

In step 2, the MN may determine a target SN (T-SN) of a CPC by using the measurement information.

In step 3, the SNAddReq message may be transmitted to the T-SN determined by the MN. The SNAddReq message may include at least one of the following pieces of information (e.g., A to E):

A. MI-CPC indicator or CPC indicator;

B. Suggestion of a candidate target cell list determined by the MN;

C. Measurement result value of T-SN related frequency (Result value of signal strength of cells measured at the frequency);

D. RRC CG-ConfigInfo, that is, RRC configuration information requested to a target Pscell; and/or E. Current SCG configuration information, that is, current SCG configuration information received from the S-SN.

For example, among the pieces of information of A to E, the CG-ConfigInfo, the measurement result value of T-SN related frequency, the SCG configuration information of S-SN, etc. may be included in the RRC container and transmitted.

In step 4, the T-SN having received the information recognizes that the information indicates the MI-CPC or CPC, and may select specific cells as a candidate target cell list, among the candidate target cell list suggestion received from the MN.

In step 5, the T-SN may transfer an SNAddReqACK message to the MN. In this case, the SNAddReqACK message may include at least one of the following pieces of information:

A. MI-CPC indicator; or

B. Selected candidate target PScell information.

For example, the selected candidate target PScell information may include at least one of the PCI, CGI, or ARFCN of the selected PScell.

In addition, the information may be included in the X2/Xn field or may be included in the RRC inter node message together with the frequency information of the Pscell.

For example, the selected candidate target PScell information may include configuration information to be used by a UE or an RRCReconfiguration message configured by an SN, for each candidate target PScell.

The information may be included for each PScell when multiple PScells are selected.

In step 6, the MN may perform the following based on the received SNADDReqACK message information.

A. The MN may recognize the selected candidate target PScell.

B. In addition, with regard to each selected candidate target PScell, the MN may configure to the UE, as a condition for performing the MI-CPC, a measurement in which a measurement object (MO) corresponding to the frequency of the PScell and reportConfig are associated.

As the condition above, the measurement may imply a plurality of measurement IDs, and whether the condition is satisfied may be determined by a value obtained by taking logical operation of AND or OR in relation to satisfaction of the event of each measurement.

The reportConfig and MO corresponding to each measurement ID may correspond to the following types.

For example, when the UE is in E-UTRAN new radio-dual connectivity (EN-DC), the reportConfig and MO corresponding to each measurement ID may be indicated as follows:

MO: MeasObjectNR corresponding to a frequency at which a target PScell exists is configured; and reportConfigInterRAT:

newA3: When an inter RAT neighbor cell or an inter RAT candidate target PScell associated with this reportConfig is better than or equal to the current Pscell by at least a specific offset value, newA5: When the current PScell has a value smaller than a specific threshold value, and the inter RAT neighbor cell or the inter RAT candidate target PScell associated with this reportConfig has a value greater than a specific threshold value, and newB1: When the inter RAT neighbor or the inter RAT candidate target PScell associated with this reportConfig has a value greater than a specific threshold value.

For example, when the UE is in NR-DC, the reportConfig and MO corresponding to each measurement ID may be indicated as follows:

MO: MeasObjectNR corresponding to a frequency at which the target PScell exists is configured; and reportConfigNR:

newA3: When a neighbor cell or a candidate target PScell associated with this reportConfig is better than or equal to the current Pscell by at least a specific offset value, newA5: When the current PScell has a value smaller than a specific threshold value, and the neighbor cell or the candidate target PScell associated with this reportConfig has a value greater than a specific threshold value, and newA4: when a neighbor cell or a candidate target PScell associated with this reportConfig has a value greater than a specific threshold value.

The new event may be introduced as a new type of event, or may be expressed as a new event by including a 1-bit flag in the A3/A5/B1/A4 event configuration and the like in the existing reportConfig.

C. The MN may associate CPC execution condition information for each PScell with SCG configuration information received from the T-SN and transfer the associated information to the UE.

The execution condition information may be indicated as an id of measurements for the MI-CPC execution condition configured for the UE in the operation B described above.

D. If an MO corresponding to the frequency of the current PScell is not configured in a master cell group (MCG) measurement configuration, the MN may additionally configure a measurement having the corresponding MO or may separately request the PScell measurement from the UE.

In step 7, the MN may include the configuration information and condition information for MI-CPC in each candidate target PScell (e.g., including in a condReconfig field), and may transfer measurement configuration corresponding to each condition information and configuration information for strength measurement of the current PScell (e.g., including in an MCG measConfig field) to the UE.

For example, the information for measurement of the current PScell is not included in measconfig, but the information may include separate ARFCN and PCI and synchronization signal block (SSB)/channel state information-reference signal (CSI-RS) information for measurement and be separately transmitted to the UE in addition to measconfig.

For example, the above pieces of information may be included in the RRCReconfiguration message of the MN.

In step 8, upon receiving the RRCReconfiguration message, the UE may transmit a complete message to the MN.

In step 9, after receiving the message, the UE may store CPC configuration information and conditional information in a variable for MCG conditional reconfiguration, and may perform measurement included in MCG measConfig by including the measurement configuration configured as the condition for MI-CPC. Additionally, when configuration information for measurement of the current PScell is transmitted separately in addition to the measConfig, the UE may also perform measurement of the current PScell. Further, the UE may evaluate whether the given MI-CPC condition is satisfied.

In step 10, if there is a condition of satisfying at least one of the conditions given as the MI-CPC, the UE may apply candidate target PScell configuration information corresponding to the satisfied CPC condition. That is, the UE may perform a PScell change.

In step 11, the UE may perform a random access procedure on the candidate target PScell in which the above condition is satisfied.

In step 12, the UE may transfer an RRCReconfigurationComplete message in an MN RRC format to the MN. In this case, the conditional reconfiguration id associated with the candidate target PScell determined to be performed by satisfying the condition may be included in the RRCReconfigurationComplete message.

In step 13, the MN having received the RRCReconfigurationcomplete message may identify the conditional reconfiguration id included in the message so as to identify the T-SN, and may transfer an SN Reconfiguration Complete message to the target PScell corresponding to a condReconfig ID included therein.

In step 14, the MN may additionally transfer an SN release request message to the S-SN.

In step 15, the S-SN having received the SN release request message may release a UE context and transfer the SN release Req ACK message to the MN.

In an embodiment of the disclosure, instead of the T-SN transmitting the determined PScell information to the MN, the UE may transmit the PScell information by using a measurement report.

In this case, the PCI/CGI/ARFCN information of the PScell may not be included in the SNAddReqACK in step 0 or step 5 described above. Instead, after the UE receives the SCG config configuration information included in the SNAddReqACK during step 0 or 5, the UE may identify the information of the current PScell (step 0) or the information of the selected candidate target PScell (step 5), and then may include the corresponding PScell information (PCI/CGI/ARFCN or a serving cell index) in a measurement report of an MN RRC and transfer the same. In this case, the MN having received the measurement report may know the PCI/CGI/ARFCN and the like of the current and candidate target PScells. Thereafter, the remaining operations may be the same as those in the flowchart of FIG. 8.

Figure 9:
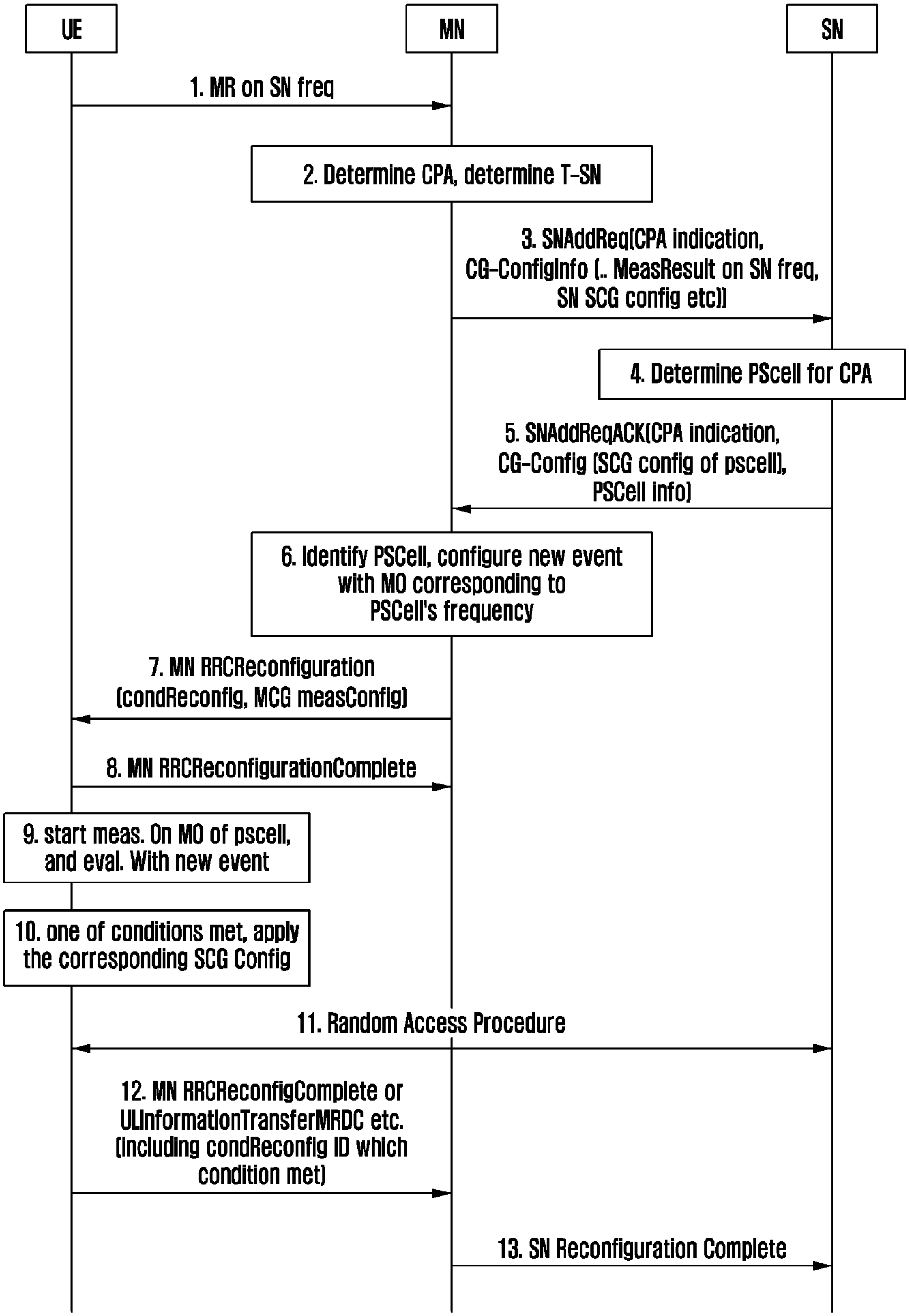
FIG. 9 illustrates a procedure of a master node initiated conditional PScell addition according to an embodiment of the present disclosure.

FIG. 9 illustrates an example of signaling related to conditional PScell addition (CPA) according to an embodiment of the present disclosure.

The order of the operation steps shown in FIG. 9 may be changed from each other. Further, in some cases, some operation steps of FIG. 9 may be omitted or two or more steps may be combined and performed as one step.

Each step will be described in detail with reference to FIG. 9.

In step 1, a UE may transfer a measurement result on SN frequency to an MN in a situation in which only single connection is established.

In step 2, the MN having received this information may determine the CPA and determine a T-SN.

In step 3, the MN may transfer an SNAddReq message to the T-SN.

The SNAddReq message may include at least one of the following pieces of information:

CPA indicator,

CG-Config Info, that is, configuration request information of a target PScell,

Measurement result information for SN frequency, or

Candidate target PScell suggestion list.

In step 4, the T-SN having received the SNAddReq message may determine a PScell for CPA from a predetermined candidate target PScell suggestion list.

In step 5, the T-SN may include the corresponding cell information in the SNAddReqACK message and transfer the message to the MN. For example, the Pscell information may correspond to PCI/CGI/ARFCN information. In addition, the SCG configuration information and CPA indication of the PScell may be included in the message.

In step 6/7, the MN having received the SNAddReqACK message may identify a candidate PScell, may map an MO corresponding to the PScell and reportConfig indicating the execution condition, and may include the mapped information in the MCG measurement configuration and transfer the configuration to the UE. Separately, the MN may associate a measurement id, which implies a condition and configuration information for each received candidate target PScell, with the MCG measurement configuration and transfer the associated measurement id to the UE. This information may be included in the RRCReconfiguration message of the MN. Events corresponding to conditions for the CPA may correspond to the following.

The reportConfig and measurement object corresponding to each measurement id may correspond to the following types.

i) When the UE is in EN-DC:

MO: MeasObjectNR corresponding to a frequency at which a target psCell exists is configured; and reportConfigInterRAT:

newA3: When an inter RAT neighbor cell or an inter RAT candidate target PScell associated with this reportConfig is better than or equal to the current Pscell by at least a specific offset value, newA5: When the current psCell has a value smaller than a specific threshold value, and the inter RAT neighbor cell or the inter RAT candidate target PScell associated with this reportConfig has a value greater than a specific threshold value, and newB1: When an inter RAT neighbor or an inter RAT candidate target PScell associated with this reportConfig has a value greater than a specific threshold value;

ii) When the UE is in NR-DC:

MO: MeasObjectNR corresponding to a frequency at which a target PScell exists is configured: and reportConfigNR:

newA3: When a neighbor cell or a candidate target PScell associated with this reportConfig is better than or equal to the current Pscell by at least a specific offset value, newA5: When a current PScell has a value smaller than a specific threshold value, and the neighbor cell or the candidate target PScell associated with this reportConfig has a value greater than a specific threshold value, and newA4: When a neighbor cell or a candidate target PScell associated with this reportConfig has a value greater than a specific threshold value.

The new event may be introduced as a new type of event, or may be expressed as a new event by including a 1-bit flag in the A3/A5/B1/A4 event configuration and the like in the existing reportConfig.

In step 8, upon receiving the RRCReconfiguration message, the UE may transfer a complete message to the MN.

In step 9, upon receiving the corresponding measurement configuration, the UE may perform the measurement included therein and determine whether the CPA condition is satisfied.

In step 10, if the indicated CPA condition is satisfied, the corresponding PScell may be added by applying the associated SCG configuration, that is, the candidate PScell configuration.

In step 11, the UE may perform a random access procedure on a candidate PScell in which the indicated CPA condition is satisfied.

In step 12, the UE may transfer an RRCReconfigurationComplete message in the MN RRC format to the MN. In this case, the conditional reconfiguration id associated with the candidate target PScell determined to be performed by satisfying the condition may be included in the RRCReconfigurationComplete message.

In step 13, the MN having received the RRCReconfigurationcomplete message may identify a conditional reconfiguration id included therein so as to identify the T-SN, and transfer the SN Reconfiguration Complete message to a target PScell corresponding to the condReconfig ID included therein.

Figure 10:
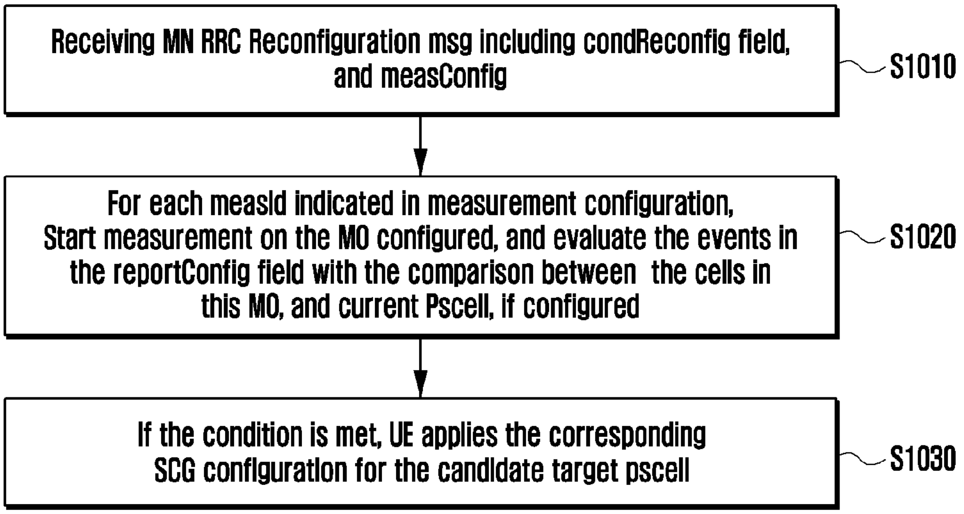
FIG. 10 illustrates a flow chart of a UE operation in a case of MI-CPC according to an embodiment of the present disclosure.

FIG. 10 illustrates an example of a terminal operation flowchart for an MI-CPC according to an embodiment of the present disclosure.

The order of the operation steps shown in FIG. 10 may be changed from each other. In addition, in some cases, some operation steps of FIG. 10 may be omitted or two or more steps may be combined and performed as one step.

A terminal may receive a message (e.g., MN RRC Reconfiguration msg) including conditional reconfiguration information (e.g., condReconfig field) and/or measurement configuration information (e.g., measConfig) from an MN in operation S1010.

For example, the conditional reconfiguration information (e.g., condReconfig field) may include candidate target PScell configuration information of MI-CPC, and may include CPC execution configuration information associated with the candidate target PScell. The execution configuration information may be expressed as a measurement ID, and the measurement ID may indicate one of measurement configuration IDs transmitted together or previously transmitted. For example, measurement configuration information may include information on MO and information on a report configuration associated with the measurement (e.g., reportconfig). As one example, the information on MO may indicate a frequency band to which a target PScell belongs. In addition, the information on the report configuration associated with the measurement (e.g., reportconfig) may include event information associated with CPC. As one example, the event information may include information on an event associated with PScell which is newly defined. Alternatively, the event information may include 1 bit information indicating whether an event is associated with the PScell.

The terminal having received the information may perform measurements included in the measurement configuration information, and evaluate whether an event included in the reportConfig corresponding to the execution configuration information of each candidate target PScell is satisfied, in operation S1020.

The events may include a comparison between the measured strength of the current PScell and the measured strengths of other cells.

As an example, the event may include at least one of the following events. A first event may indicate a case in which a measurement result of a neighboring cell or a target PScell is greater than or equal to a measurement result of the source PScell by at least an offset value. A second event may indicate a case where the measurement result of the source PScell is lower than the threshold value and the measurement result of the neighboring cell or the target PScell is greater than the threshold value. A third event may indicate a case in which a measurement result of a neighboring cell or a target PScell is greater than a threshold value.

If the CPC or CPA execution condition of a specific candidate target PScell is satisfied, a PScell change or addition may be performed by applying the associated configuration, in operation S1030.

Further, in case that the CPC execution condition is satisfied, the terminal may change the PScell and transmit a configuration complete message to the MN informing that the PScell change is complete.

Figure 11:
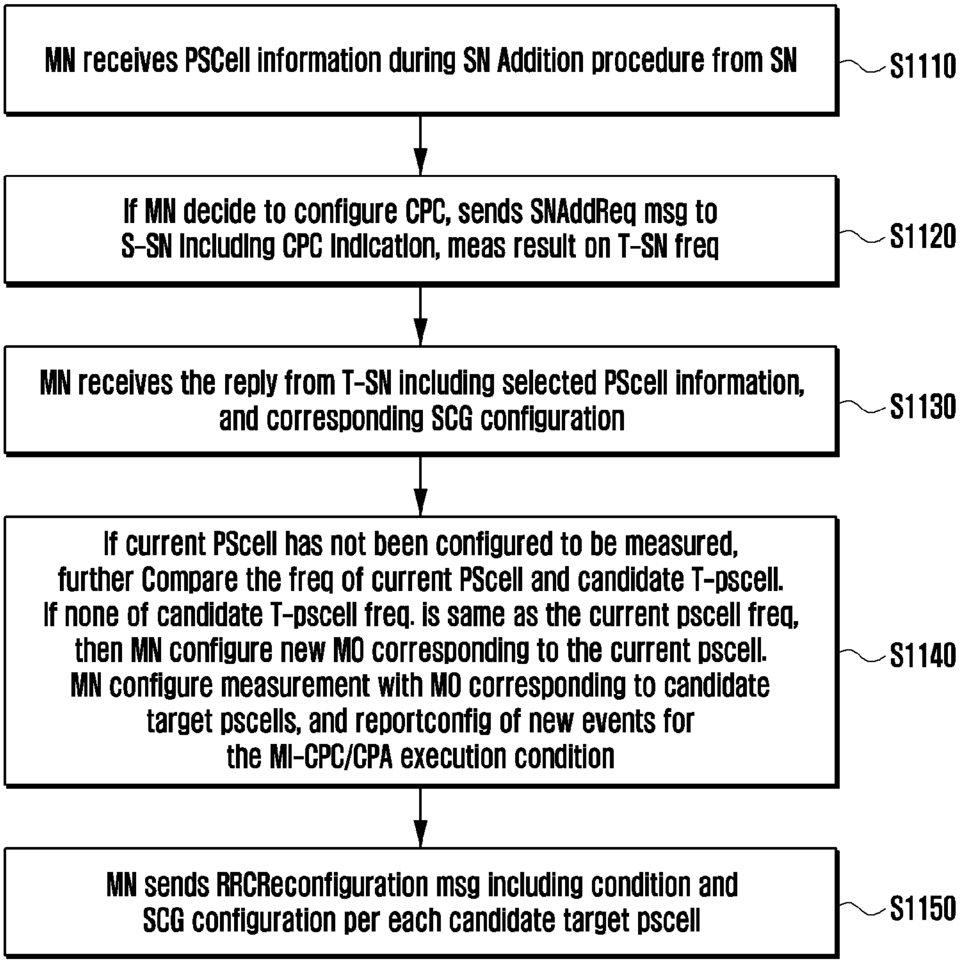
FIG. 11 illustrates a flow chart of a master node operation in a case of MI-CPC according to an embodiment of the present disclosure.

FIG. 11 illustrates an example of an operation flowchart of an MN during an MI-CPC according to an embodiment of the present disclosure.

The order of the operation steps shown in FIG. 11 may be changed from each other. Further, in some cases, some operation steps of FIG. 11 may be omitted or two or more steps may be combined and performed as one step.

The MN may receive current PScell information from an SN during an SN addition procedure in operation S1110.

If the MN attempts to configure the CPC, the MN may determine a T-SN and then transmit an SNAddReq message to the T-SN, in operation S1120. For example, the SNAddReq message may include an MI-CPC or CPC indicator. In addition, the SNAddReq message may include the measurement result of the T-SN frequency and the candidate target PScell suggestion list.

As a response from the T-SN having received the information, the MN may receive information for recognition of the selected candidate PScell and SCG configuration information to be applied in the corresponding Pscell, in operation S1130.

If measurement of a current PScell or measurement of the frequency to which the current PScell belongs has not been performed, the MN may configure the frequency of the current PScell as an MO, or may include PScell information (e.g., PCI/CGI/ARFCN) in a separate message field and transmit the same to the terminal. Accordingly, the MN may indicate the measurement of the current PScell, and may include a measurement ID, obtained by combining the measurement object of the frequency corresponding to the candidate PScells selected from the T-SN and the report Config corresponding to the execution condition for performing CPC to the PScell, in the measurement configuration and transfer the same to the terminal, in operation S1140.

In this case, event information such as the previously mentioned newA3/newA4/newA5 and the like may be configured in the reportConfig. The even information may be information on an event associated with the PScell, which is newly defined. Alternatively, the event information may include 1 bit information indicating whether an event is associated with the PScell.

The MN may include the pieces of information above (e.g., information on MO, information on a report configuration associated with the measurement (reportconfig) etc.) in the MN RRCReconfiguration message and transfers the message to the UE in operation S1150.

The MN may receive a complete message from the UE as a response. In case that the CPC condition is satisfied, the terminal may change the PScell and transmit the complete message to the MN.

When the UE includes a conditional reconfiguration ID of the performed CPC in the MN RRC message such as RRCReconfiguration or UEInformationTransfer and transfers the MN RRC message to the MN during a predetermined period of time, the MN may identify the ID and transfer an indication indicating that the CPC has been performed to the T-SN.

According to an embodiment of the disclosure, a method performed by a terminal in a wireless communication system may be provided. An MN may transfer a measurement configuration for comparing the signal strengths of a current PScell and a candidate target PScell to the terminal, as a PScell change condition. For this operation performed by the terminal, a message which is transferred to the MN after performing an SN addition or SN modification procedure of an S-SN may additionally include information of the currently determined PScell. In addition, after determining the conditional PScell change of the MN, the terminal may receive candidate target PScell information from a T-SN, and the MN may indicate measurement of the current PScell and the candidate target PScell.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a RAM and a flash memory, a ROM, an electrically erasable programmable read only memory (EEPROM), a magnetic disc storage device, a CD-ROM, DVDs, other type optical storage devices, or a magnetic cassette. Alternatively, any combination of some or all of the memory devices may form a memory in which the program is stored. Further, a plurality of such memories may be included in the electronic device.

In addition, the programs may be stored in an attachable storage device which may access the electronic device through communication networks such as the Internet, Intranet, a local area network (LAN), a wide LAN (WLAN), and a storage area network (SAN) or a combination thereof. Such a storage device may access the electronic device via an external port. Further, a separate storage device on the communication network may access a portable electronic device.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, one embodiment of the disclosure may be partially combined with other embodiments to operate a BS and a terminal. As an example, a first and second embodiment of the disclosure may be combined with each other to operate a BS and a terminal. Further, although the above embodiments have been described on the basis of the FDD LTE system, other variants based on the technical idea of the embodiments may also be implemented in other communication systems such as TDD LTE, 5G, or NR systems.

In the drawings in which methods of the disclosure are described, the order of the description does not always correspond to the order in which steps of each method are performed, and the order or relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a master node (MN) supporting a dual connectivity operation in a wireless communication system, the method comprising:

transmitting, to a target secondary node (SN), an SN addition request message for a conditional primary secondary cell group (SCG) cell (PSCell) change (CPC), the SN addition request message including information on a plurality of candidate target PSCells suggested by the MN and information on measurement results for the plurality of candidate target PSCells;

receiving, from the target SN, an SN addition request acknowledge message including information on a candidate target PSCell for the CPC which is selected, based on the information on the plurality of the candidate target PSCells and the information on the measurement results, from the plurality of the candidate target PSCells;

transmitting, to a terminal, a radio resource control (RRC) reconfiguration message including conditional reconfiguration information for the CPC and measurement configuration information, wherein the conditional reconfiguration information for the CPC includes configuration information for the candidate target PSCell and information on a CPC execution condition for the candidate target PSCell, the information on the CPC execution condition being indicated as a measurement identifier (ID), wherein the measurement configuration information includes information on a measurement object and information on a report configuration, wherein the information on the measurement object and the information on the report configuration correspond to the measurement ID, wherein the information on the report configuration includes event information corresponding to the CPC execution condition, and wherein the event information includes a new event indicating that a measurement result for the candidate target PSCell is greater than a threshold, wherein the new event is different from an event A4 indicating that a measurement result for a neighbor cell is greater than a threshold;

receiving, from the terminal, an RRC reconfiguration complete message transmitted in case that the CPC execution condition is satisfied; and transmitting, to the target SN, an SN reconfiguration complete message.

2. The method of claim 1, wherein the event information further includes at least one of:

a first event indicating that the measurement result for the candidate target PSCell is greater than a measurement result for a current PSCell associated with a source SN by at least an offset value, or a second event indicating that the measurement result for the current PSCell is less than a first threshold and the measurement result for the candidate target PSCell is greater than a second threshold.

3. The method of claim 1, wherein the configuration information for the candidate target PSCell includes at least one of a physical cell identity (PCI), a cell global identifier (CGI), or an absolute radio-frequency channel number (ARFCN).

4. The method of claim 1, wherein the measurement configuration information is associated with a master cell group (MCG) of the MN.

5. The method of claim 1, wherein the measurement configuration information further includes one bit indicating that the CPC execution condition is associated with a measurement result for a current PSCell and the measurement result for the candidate target PSCell.

6. A method performed by a terminal supporting a dual connectivity operation in a wireless communication system, the method comprising:

receiving, from a master node (MN), a radio resource control (RRC) reconfiguration message including conditional reconfiguration information for a conditional primary secondary cell group (SCG) cell (PSCell) change (CPC) from a current PSCell to a candidate target PSCell of a target secondary node (SN) and measurement configuration information, wherein the conditional reconfiguration information for the CPC includes configuration information for the candidate target PSCell and information on a CPC execution condition for the candidate target PSCell, the information on the CPC execution condition being indicated as a measurement identifier (ID), wherein the measurement configuration information includes information on a measurement object and information on a report configuration, wherein the information on the measurement object and the information on the report configuration correspond to the measurement ID, wherein the information on the report configuration includes event information corresponding to the CPC execution condition, and wherein the event information includes a new event indicating that a measurement result for the candidate target PSCell is greater than a threshold, wherein the new event is different from an event A4 indicating that a measurement result for a neighbor cell is greater than a threshold;

performing a measurement for the candidate target PSCell to determine whether the CPC execution condition is satisfied, based on the RRC reconfiguration message; and transmitting, to the MN, an RRC reconfiguration complete message in case that the CPC execution condition is satisfied.

7. The method of claim 6, wherein the event information further includes at least one of:

a first event indicating that the measurement result for the candidate target PSCell is greater than a measurement result for the current PSCell associated with a source SN by at least an offset value, or a second event indicating that the measurement result for the current PSCell is less than a first threshold and the measurement result for the candidate target PSCell is greater than a second threshold.

8. The method of claim 6, wherein the configuration information for the candidate target PSCell includes at least one of a physical cell identity (PCI), a cell global identifier (CGI), or an absolute radio-frequency channel number (ARFCN).

9. The method of claim 6, wherein the measurement configuration information is associated with a master cell group (MCG) of the MN.

10. The method of claim 6, wherein the measurement configuration information further includes one bit indicating that the CPC execution condition is associated with a measurement result for the current PSCell and the measurement result for the candidate target PSCell.

11. A master node (MN) supporting a dual connectivity operation in a wireless communication system, the MN comprising:

a transceiver; and a processor coupled to the transceiver and configured to:

transmit, to a target secondary node (SN), an SN addition request message for a conditional primary secondary cell group (SCG) cell (PSCell) change (CPC), the SN addition request message including information on a plurality of candidate target PSCells suggested by the MN and information on measurement results for the plurality of the candidate target PSCells, receive, from the target SN, an SN addition request acknowledge message including information on a candidate target PSCell for the CPC which is selected, based on the information on the plurality of the candidate target PSCells and the information on the measurement results, from the plurality of the candidate target PSCells, transmit, to a terminal, a radio resource control (RRC) reconfiguration message including conditional reconfiguration information for the CPC and measurement configuration information, wherein the conditional reconfiguration information for the CPC includes configuration information for the candidate target PSCell and information on a CPC execution condition for the candidate target PSCell, the information on the CPC execution condition being indicated as a measurement identifier (ID), wherein the measurement configuration information includes information on a measurement object and information on a report configuration, wherein the information on the measurement object and the information on the report configuration correspond to the measurement ID, wherein the information on the report configuration includes event information corresponding to the CPC execution condition, and wherein the event information includes a new event indicating that a measurement result for the candidate target PSCell is greater than a threshold, wherein the new event is different from an event A4 indicating that a measurement result for a neighbor cell is greater than a threshold, receive, from the terminal, an RRC reconfiguration complete message transmitted in case that the CPC execution condition is satisfied, and transmit, to the target SN, an SN reconfiguration complete message.

12. The MN of claim 11, wherein the event information further includes at least one of:

a first event indicating that the measurement result for the candidate target PSCell is greater than a measurement result for a current PSCell associated with a source SN by at least an offset value, or a second event indicating that the measurement result for the current PSCell is less than a first threshold and the measurement result for the candidate target PSCell is greater than a second threshold.

13. The MN of claim 11, wherein the configuration information for the candidate target PSCell includes at least one of a physical cell identity (PCI), a cell global identifier (CGI), or an absolute radio-frequency channel number (ARFCN).

14. The MN of claim 11, wherein the measurement configuration information is associated with a master cell group (MCG) of the MN.

15. The MN of claim 11, wherein the measurement configuration information further includes one bit indicating that the CPC execution condition is associated with a measurement result for a current PSCell and the measurement result for the candidate target PSCell.

16. A terminal supporting a dual connectivity operation in a wireless communication system, the terminal comprising:

a transceiver; and a processor coupled to the transceiver and configured to:

receive, from a master node (MN), a radio resource control (RRC) reconfiguration message including conditional reconfiguration information for a conditional primary secondary cell group (SCG) cell (PSCell) change (CPC) from a current PSCell to a candidate target PSCell of a target secondary node (SN) and measurement configuration information, wherein the conditional reconfiguration information for the CPC includes configuration information for the candidate target PSCell and information on a CPC execution condition for the candidate target PSCell, the information on the CPC execution condition being indicated as a measurement identifier (ID), wherein the measurement configuration information includes information on a measurement object and information on a report configuration, wherein the information on the measurement object and the information on the report configuration correspond to the measurement ID, wherein the information on the report configuration includes event information corresponding to the CPC execution condition, and wherein the event information includes a new event indicating that a measurement result for the candidate target PSCell is greater than a threshold, wherein the new event is different from an event A4 indicating that a measurement result for a neighbor cell is greater than a threshold, perform a measurement for the candidate target PSCell to determine whether the CPC execution condition is satisfied, based on the RRC reconfiguration message, and transmit, to the MN, an RRC reconfiguration complete message in case that the CPC execution condition is satisfied.

17. The terminal of claim 16, wherein the event information further includes at least one of:

a first event indicating that the measurement result for the candidate target PSCell is greater than a measurement result for the current PSCell associated with a source SN by at least an offset value, or a second event indicating that the measurement result for the current PSCell is less than a first threshold and the measurement result for the candidate target PSCell is greater than a second threshold.

18. The terminal of claim 16, wherein the configuration information for the candidate target PSCell includes at least one of a physical cell identity (PCI), a cell global identifier (CGI), or an absolute radio-frequency channel number (ARFCN).

19. The terminal of claim 16, wherein the measurement configuration information is associated with a master cell group (MCG) of the MN.

20. The terminal of claim 16, wherein the measurement configuration information further includes one bit indicating that the CPC execution condition is associated with a measurement result for the current PSCell and the measurement result for the candidate target PSCell.

* * * * *